United States Patent [19]
Hasegawa et al.

[11] Patent Number: 4,670,866
[45] Date of Patent: Jun. 2, 1987

[54] RECORDING MEDIUM DISK CONTINUOUS-DRIVING APPARATUS

[75] Inventors: Kazuo Hasegawa; Osamu Fujiwara, both of Nagaokakyo, Japan

[73] Assignee: Mitsubishi Denki Kabushiki Kaisha, Tokyo, Japan

[21] Appl. No.: 855,626

[22] PCT Filed: Aug. 1, 1985

[86] PCT No.: PCT/JP85/00435
§ 371 Date: Apr. 9, 1986
§ 102(e) Date: Apr. 9, 1986

[30] Foreign Application Priority Data
Aug. 10, 1984 [JP] Japan .................... 59-168217

[51] Int. Cl.⁴ .................. G11B 17/22; G11B 17/26
[52] U.S. Cl. .......................... 369/36; 369/37; 369/39; 369/191; 369/194
[58] Field of Search .............. 369/33, 34, 36, 37, 369/38, 39, 194, 191, 176, 30

[56] References Cited
U.S. PATENT DOCUMENTS 2,159,832  5/1939  Smyth ................. 369/39
3,421,802  1/1969  Irazoqui ............. 353/25
4,527,262  7/1985  Manto ................ 369/33

FOREIGN PATENT DOCUMENTS
302569 4/1955 Japan.

Primary Examiner—Steven L. Stephan
Attorney, Agent, or Firm—Oblon, Fisher, Spivak, McClelland & Maier

[57] ABSTRACT

A continuous-driving apparatus is so constructed that a recording medium disks (30a) are mountable on loading sections (4a), (4c) through cut portions (6a), (6c) and openings (5), (9) formed at the outer circumferential parts of rotating bodies (1), (3) which have a common center of rotation and are arranged in a juxtaposition; and the rotating bodies (1), (3) are caused to relatively rotate so that the specified cut portions (6a), (6c) are brought into an overlapping position with respect to the openings (5), (9): and the recording medium disk (30a) is transferred to a predetermined position by means of an elevating unit (10).

2 Claims, 10 Drawing Figures

RECORDING MEDIUM DISK CONTINUOUS-DRIVING APPARATUS

TECHNICAL FIELD

The present invention relates to an apparatus capable of recording and reproducing of data in a recording medium disk. More particularly, it relates to a recording medium disk continuous-driving apparatus for continuously recording and reproducing a plurality of recording medium disks.

TECHNICAL BACKGROUND

Heretofore, as a recording medium disk, an audio compact disk has been known, for example. To record data in such compact disk or to reproduce the data from the disk, there has been proposed an apparatus such that a plurality of disks are arranged in an overlapping state with their surfaces to be recorded opposed and a disk among the disks is taken out by an arm-like carrier to transfer it in a desired position for reproduction as shown in Japanese Patent Application No. 78304/1981 (Japanese Unexamined Patent Publication No. 195363/1982). The conventional recording and reproducing apparatus of this kind has a problem that it is necessary to set each disk in the apparatus at every time of recording and reproducing, hence it takes much time of replacement of the disks when a plurality of disks are continuously driven.

DISCLOSURE OF THE INVENTION

In the present invention, there is provided a recording medium disk continuous-driving apparatus for recording data in a recording medium disk to be rotated and reproducing the data from the disk, which comprises a plurality of rotating bodies having a common center of rotation, each of which is provided at the outer circumferential part with a plurality of loading sections for receiving the recording medium disks and at least one opening formed between the loading sections so that a disk can be passed through the same, each of the loading sections being provided with a cut portion; a rotary drive unit which rotates the rotating bodies at predetermined angles independent of each other to bring the cut portion of the loading section of any one of the rotating bodies into an overlapping position to the openings of the other rotating bodies; and an elevating unit for raising and lowering any of the recording medium disks mounted on the loading sections in the overlapping positions by means of a lifter passing through the cut portions, whereby a plurality of recording medium disks can be continuously recorded and reproduced.

BRIEF DESCRIPTION OF THE INVENTION

FIGS. 1 to 10 show embodiments of the present invention in which FIG. 1 is a perspective view showing an important part of an embodiment;

FIG. 2 is a cross-sectional view of FIG. 1;

FIG. 3 is a diagram corresponding to FIG. 1 which shows a state that a compact disk is located in the apparatus as shown in FIG. 1;

FIG. 4 is a cross-sectional view of FIG. 3;

Figure 9:
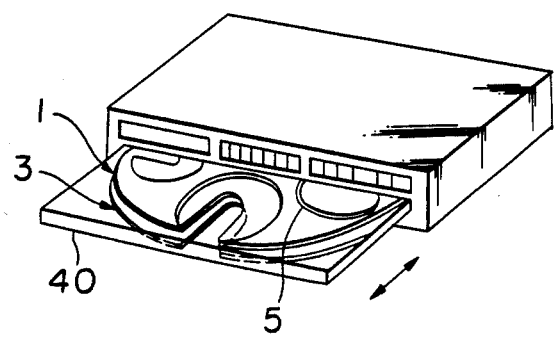
Figure 10:
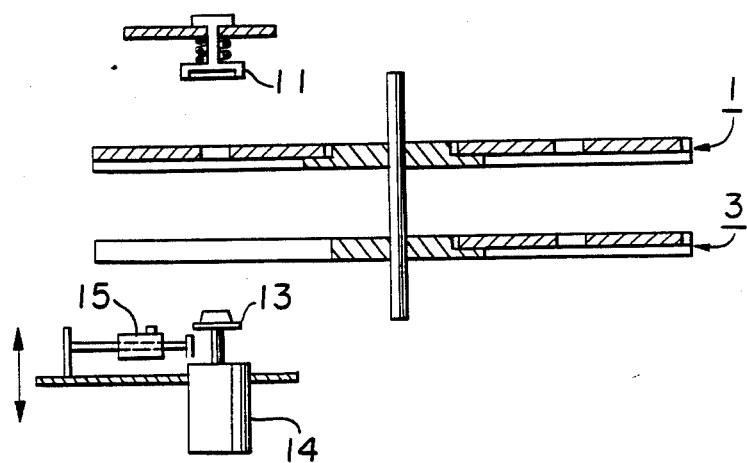

FIGS. 5 to 8 diagrams showing operations of the embodied apparatus;

FIG. 9 is a diagram showing the entirety of a compact disk player to which the apparatus of the present invention is applied; and FIG. 10 is a cross-sectional view of an important part of another embodiment of the present invention.

BEST MODE FOR CARRYING OUT THE PRESENT INVENTION

Figure 1:
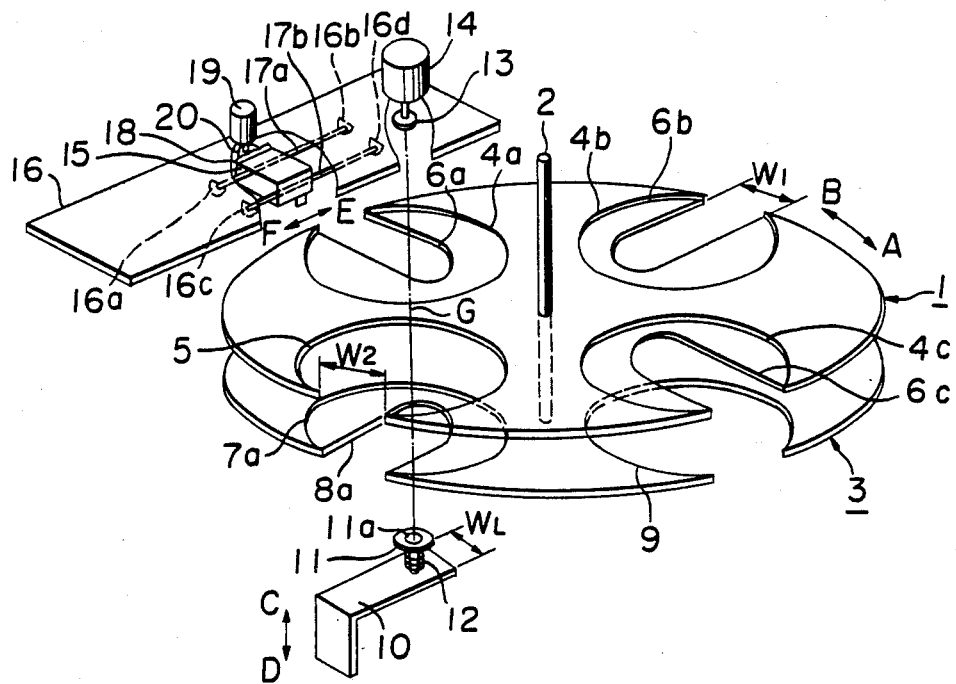

In the following, the present invention will be described as to a reproducing apparatus (a disk player) using an audio compact disk. FIG. 1 shows an important part of a disk player in which a reference numeral (1) designates an upper table capable of receiving three compact disks (not shown), which is pivotted so as to be rotatable through a shaft 2. A lower table 3 having the same construction as the upper table is rotatably fitted to the shaft 2 at a position below the upper table 1. Reference numerals (4a), (4b), (4c) designate loading sections for the compact disks which are formed in the upper surface of the upper table (1), and each of the loading sections (4a), (4b), (4c) are so arranged that they are in a circle inscribed to the outer circumference of the table which is around the center of the upper table (1); they have a diameter slightly greater than that of the compact disk and have a recessed portion in the loading section in which the compact disk is fitted when the disk is mounted. A reference numeral 5 designates a circular opening which is formed between a pair of loading sections, has an outer circumferential part which is open-cut with a width ($W_2$), and is arranged in the circumferential direction of the table (1) with a distance same as the distances between the loading sections 4a and 4b, and 4b and 4c. Reference numerals (6a), (6b), (6c) designate cut portions which are respectively formed in the loading sections (4a), (4b), (4c), each of the cut portions being formed in a substantially rectangular shape with its width ($W_1$) so as to constitute an elongated hole extending in the direction of the shaft (2). The width ($W_1$) and the width ($W_2$) are greater than the width of a lifter as described below so that the lifter can be passed through the cut portions and the openings when it is raised or lowered. A reference numeral (7a) designates a loading section formed in the lower table (3) as similar to the loading sections (4a), (4b), (4c). Other two loading sections are omitted in the drawing for the purpose of simplification. Reference numerals (8a), (9) are respectively designate a cut portion and an opening formed in the same manner as those in the upper table (1). The upper and lower tables (1), (3) are adapted to rotate in the direction of the arrow mark A or B around the shaft 2 as its center by a driving unit although it is not shown in the drawing.

Figure 2:
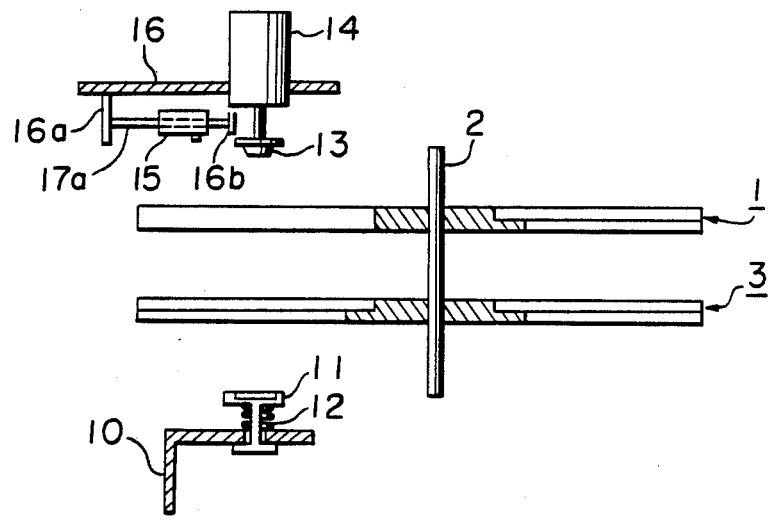

Reference numeral (10) designates a lifter which has a width ($W_L$) slightly smaller than the above-mentioned width ($W_1$) or ($W_2$) and which raises or lowers a disk by the driving unit (not shown). A numeral (11) designates a clamp which is driven in a manner of vertically movable in the direction of the arrow mark C or D with respect to the lifter (10), the clamp (11) being always urged by a spring (12) in the arrow mark direction C. The lifter (10) carries a compact disk (not shown) and vertically moves when, for instance, the center of the loading section (7a) of the lower table (3) and the center of the opening (5) of the upper table (1) come a position on an imaginary line (G) extending vertically from the center (11a) of the clamp as shown in the Figure. In other words, when the loading section of either the upper table (1) or the lower table (3) and the opening of the other of them come to a position just above the lifter (10), the compact disk is moved by the raising and lowering movement of the lifter (10). A numeral (13) designates a turn table which has a projection to be inserted in the central aperture of the compact disk carried by the lifter (10) and is fitted in a recess formed in the upper surface of the clamp (11) and which drives and rotates the compact disk held by a motor (14). A numeral (15) designates an optical pick-up device which irradiates a laser beam to the compact disk clamped between the lifter (10) and the turn table (13) to be subjected to rotation, and effects photoelectric conversion of a reflecting light and which enables reciprocating movement along guide rods (17a), (17b) extended between two pairs of guide holders (16a), (16b) and (16c), (16d). A numeral (18) designates a rack fitted to the side surface of the optical pick-up device (15), which is interlocked with a pinion (20) fixed to a feed motor (19) and which effects reciprocating movement of the optical pick-up device (15) along the guide rods (17a), (17b) by a driving force of the motor (19). FIG. 2 is a cross-sectional view of FIG. 1.

The operation of the disk player having the above-mentioned construction will be described with reference to FIGS. 3 to 8. Assuming that the compact disks (30a), (30b), (30c) are respectively placed on the loading sections (4a), (4b), (4c) of the upper table 1 and the compact disk (30d) is placed on the loading part (7a) of the lower table (3) with their surfaces holding signals directing upward.

Figure 3:
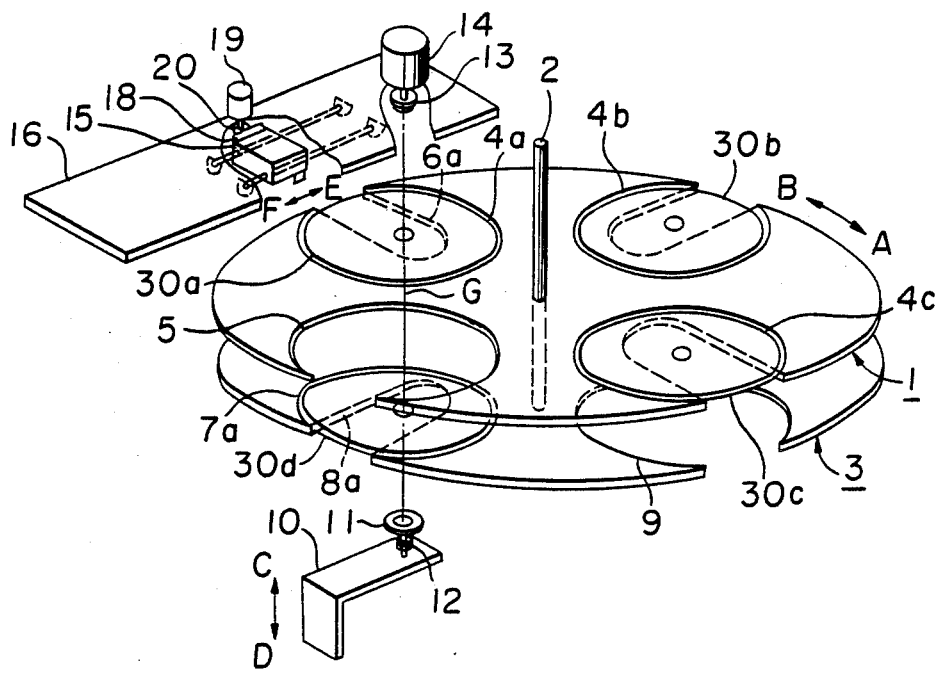
Figure 4:
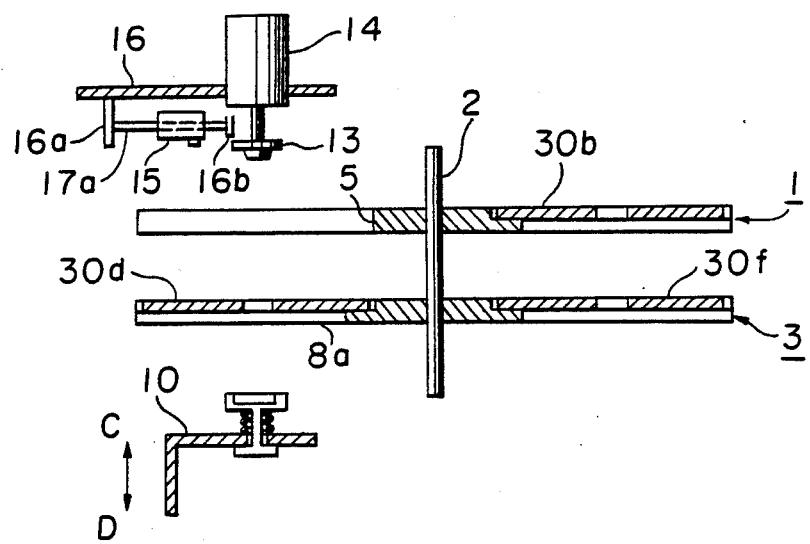
Figure 5:
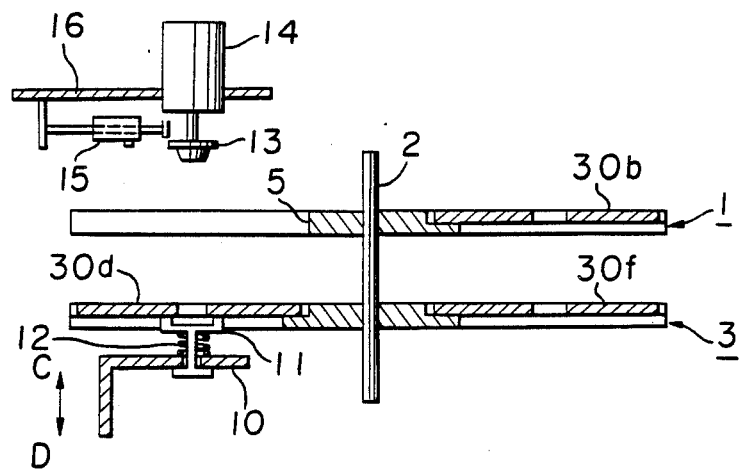
Figure 6:
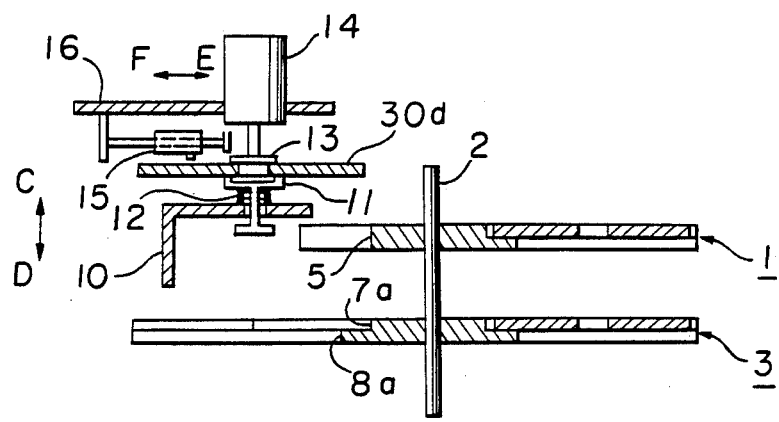

Now, description will be made as to a case that the compact disk (30d) is to be reproduced. When the lifter (10) is raised in the direction of the arrow mark C from the state as shown in FIG. 4, the clamp (11) comes into contact with the compact disk (30d) on the loading section (7a) of the lower table (3) as shown in FIG. 5, and then, the lifter (10) carrying the compact disk (30d) moves upwardly through the cut portion (8a) of the lower table (3) and the opening (5) of the upper table (1) along the imaginary line (FIG. 3) and thereafter, it reaches the turn table (13) located at the upper position as shown in FIG. 6, where the projection of the turn table (13) is fitted to the recess of the clamp (11) by passing through the central hole of the compact disk (30d), whereby the disk (30d) is clamped. In such condition, when the motor (14) is started, the compact disk (30d) is rotated and the feed motor (19) is rotated in association with the optical pick-up device (15). When the pinion (20) of the feed motor (19) is rotated, the optical pick-up device (15) is reciprocatedly moved along the guide rods (17a), (17b) by means of the rack (18) interlocked with the pinion, whereby information signals in the upper surface of the compact disk (30d) is reproduced. When reproducing operations are finished, the operation of the optical pick-up device (15) is stopped and the lifter (10) is lowered to be returned to the condition as shown in FIG. 14 through the condition of FIG. 5.

Reproduction of another compact disk in the lower table (3) is carried out as follows. The lower table (3) is turned in the direction of the arrow mark A or B in FIG. 3, and a desired compact disk is moved to the imaginary line (G). Then, the same operations as above-mentioned are repeated to effect recording or reproducing.

Figure 7:
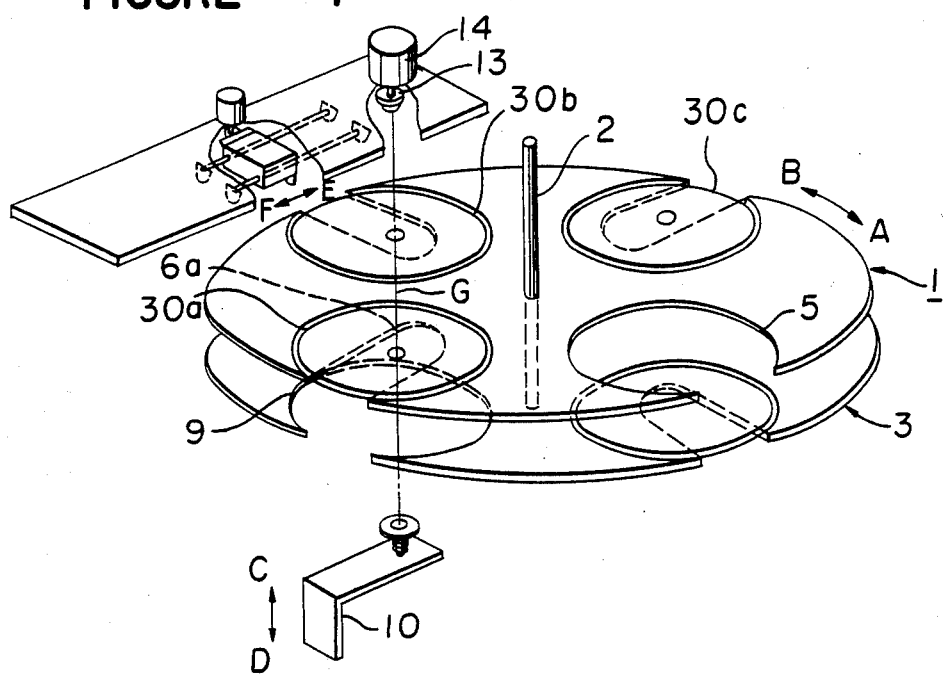
Figure 8:
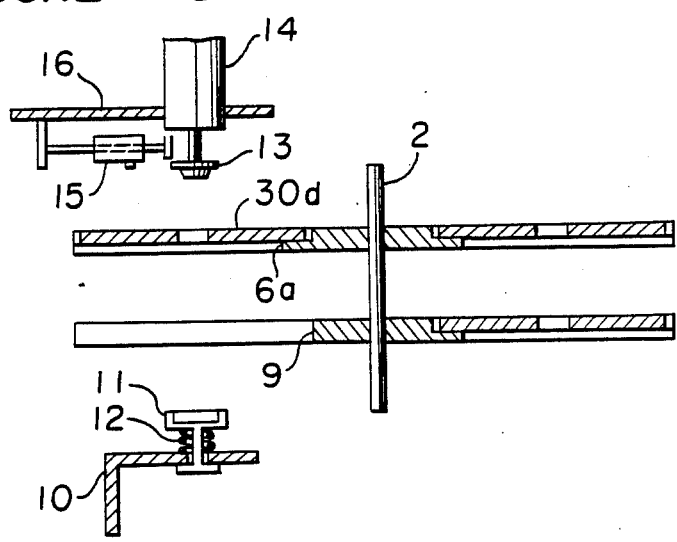

Reproduction of a desired compact disk (30a) on the upper table (1) from the state of FIG. 3 will be described. The lower table (3) is rotated in the direction of the arrow mark A (FIG. 3) to bring the opening (9) to the imaginary line (G), and then, the upper table (1) is rotated to bring the compact disk (30a) to the imaginary line (G) so that the disk player is set in a state as shown in FIG. 7. Thereafter, when the lifter (10) is raised from the state of FIG. 8, the lifter (10) passes the opening (9) of the lower table (3) and the cut portion (6a) of the loading section (4a) of the upper table (1) to reach the turn table (13) together with the compact disk (30a) placed on the loading section (4a), where the compact disk (30a) is clamped by the spring action of the cramp (11). Then, the information signals are reproduced by means of the optical pick-up device (15). Reproduction of other compact disks (30b), (30c) on the upper table (1) is carried out by shifting each of the compact disks on the imaginary line (G). Thus, data in a desired compact disk can be reproduced by rotating the upper and lower tables (1), (3) in appropriate directions. In this case, it is not always necessary to place compact disks at all of the loading sections, but a single disk may be used in a loading section as similar to the conventional disk player. For convenience for use of a disk player by a user, a disk detecting means may be provided in each of the loading sections to detect presence or absence of the disks and to give a notice to the user.

FIG. 9 shows another embodiment of the apparatus in which the above-mentioned compact disk player is applied, more specifically, a table unit (40) can be pulled out from the lower portion of the apparatus so that the compact disk is easily put. In this case, insertion of the compact disk into the upper table (1) is carried out by manually turning the table (1) and insertion of the compact disk into the lower table (3) is carried out by positioning the opening (5) of the upper table (1) in the front of the table unit and by turning lower table (3) so as to coincide the opening (5) of the upper table (1). The table unit (40) may be detachable from the main body of the apparatus. Also, it may be so constructed that the table unit holding the compact disks can be preserved.

In the above-mentioned embodiments, description has been made as to a case that three loading sections are formed in each of the upper and lower tables (1), (3). The number of the loading sections can be determined as desired. Further, a plurality of openings are formed in each of the upper and lower tables (1), (3) whereby waiting time in which a disk on the other table is ready for reproduction can be reduced. When an additional number of compact disks are desired, the number of tables can be increased. In this case, all the openings of the tables except for the table on which a compact disk is placed are brought into a position just above the clamp.

In the above-mentioned embodiment, the optical pick-up device (15) is used at a stationary position. However, the same effect can be obtained by such construction that the optical pick-up device (15) is caused to vertically moved and the clamp (11) is fixed as shown in FIG. 10. In this case, it is necessary that surfaces of the compact disks in which signals are recorded are directed downward.

INDUSTRIAL UTILITY

It is apparent that the present invention is applicable not only to an audio compact disk, but also a photomagnetic disk, optical video disk and so on.

The present invention is also applicable to a recording apparatus in which a plurality of recording medium disks are used or a reproducing apparatus.

What is claimed:

1. A recording medium disk continuous-driving apparatus for recording data in a recording medium disk to be rotated and reproducing the data from said disk, characterized by comprising:

a plurality of rotating bodies having a common center of rotation, each of which is provided at the outer circumferential part with a plurality of loading sections for receiving said recording medium disks and at least one opening formed between said loading sections so that a disk can be passed through the same, each of said loading sections being provided with a cut portion;

a rotary drive unit which rotates said rotating bodies at predetermined angles independent of each other to bring said cut portion of the loading section of any one of said rotating bodies into an overlapping position to said openings of the other rotating bodies; and an elevating unit for raising and lowering any of said recording medium disks mounted on said loading sections in the overlapping positions by means of a lifter passing through said cut portions.

2. A recording medium disk continuous-driving apparatus according to claim 1, wherein said recording medium disk has optically recorded data.

* * * * *